Dec. 27, 1932.  J. F. TICHY  1,892,595
POURING DEVICE
Filed Nov. 23, 1931
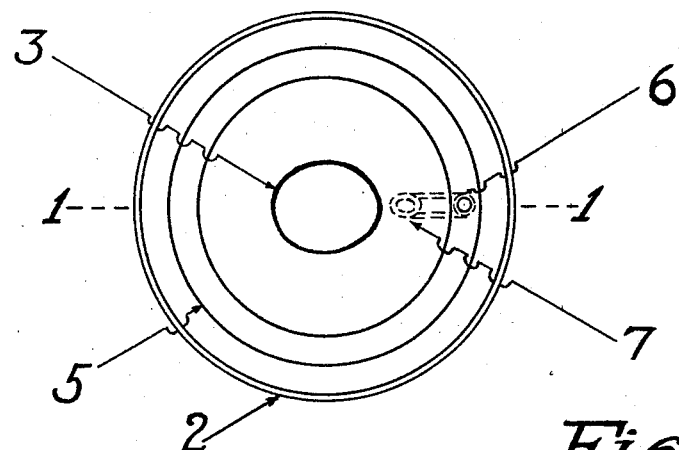
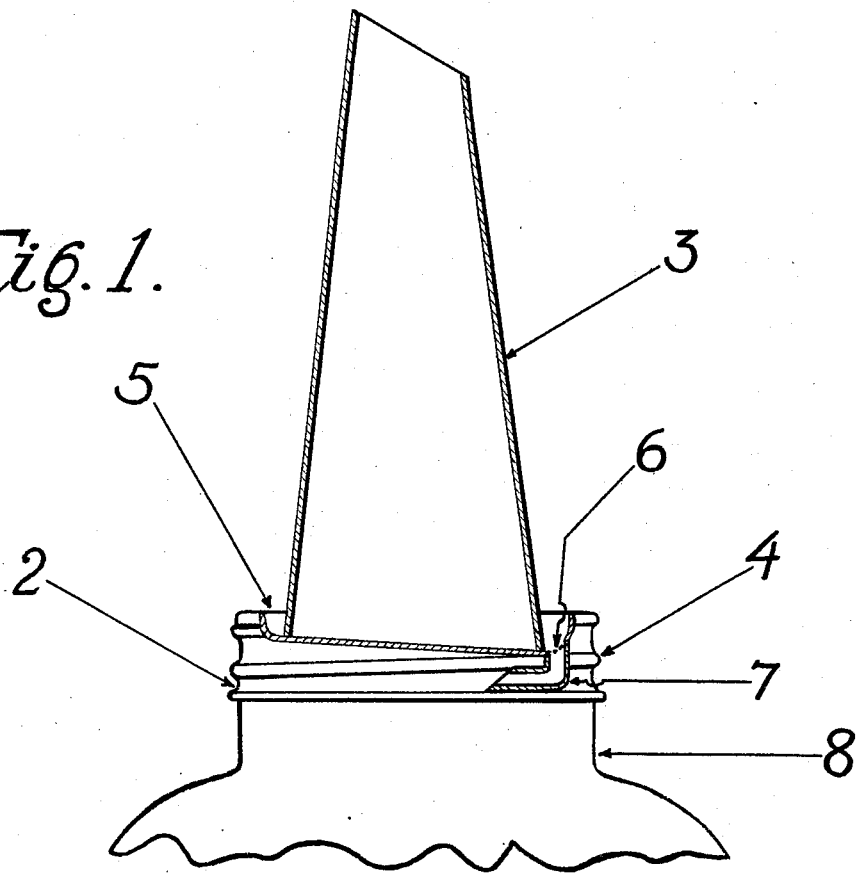
Inventor
Joseph F. Tichy Patented Dec. 27, 1932

1,892,595

UNITED STATES PATENT OFFICE

JOSEPH F. TICHY, OF FLUSHING, NEW YORK, ASSIGNOR OF ONE-HALF TO GEORGE H. BRUNS, OF JAMAICA, NEW YORK

POURING DEVICE

Application filed November 23, 1931. Serial No. 576,628.

My invention relates to a cover element having an attached spout, and more particularly comprises a means for preventing the drip from the spout travelling down the outside of the vessel containing a liquid which is discharged from the vessel through the spout by inverting the vessel. My invention may be adapted, for instance, to the containers used by automobile service stations in dispensing lubricating oils, and especially in conveying said lubricating oils in convenient unit quantities from a storage tank to the oil reservoir of an automobile. My invention may likewise be adapted to the containers employed when lubricating oil is sold in convenient units under seal.

Spout-covers of this general type have been made heretofore and are in general use. As employed for the vending of lubricating oils the vessel is filled with oil from a storage tank, and the spout when the vessel is inverted is inserted in the breather pipe leading to the oil reservoir of the automobile motor. When the contents of the container have been thus discharged a quantity of oil adhering to the outside of the spout runs down the spout when withdrawn from the breather pipe, spreads over the cover of the container and thence over the outside of the container. This necessitates wiping the container each time it is used, and frequently involves soiling the automobile either by direct dripping of the oil from the container or by transferring the oil by means of the hands which handle the container.

According to my invention I prevent any oil that may adhere to or drip from the spout, reaching the outside of the container, and thus obviate the necessity for repeatedly wiping the container, and avoid soiling the automobile. I further expedite the process of vending lubricating oil by eliminating the necessity of wiping the container and the hands of the vender each time the containers are used.

I attain the object of my invention in the manner illustrated in the accompanying drawing, in which Figure 1 is a side elevation partly in section of a typical cover and spout unit embodying my invention; and Figure 2 is a plan view of a cover and spout unit illustrating the details of my improvement. Similar numerals refer to similar parts in both views. The side elevation is taken on the line 1—1 of the plan view.

In the illustration shown in Figure 1, a glass jar 1 is indicated as a vessel to contain, for instance, one quart of lubricating oil. A pouring device consisting of a cover 2 and a spout 3 are indicated, the cover being threaded as 4 to correspond with like threads on the top portion of the jar. The cover and spout comprise a single unit. A circular well may be formed by the groove 5 circumjacent to the spout, and the groove is slanted or tapered at the bottom to drain toward the orifice 6 in the bottom of the groove at its low point. A vent tube 7 is attached to the inside of the cover at the orifice. It will readily appear that any drip from the mouth of the spout or any liquid adhering to the outside of the spout when the inverted device is restored to its normal position, will travel down the spout until intercepted by the well circumjacent to the bottom of the spout, being diverted by the inclination of the groove to the orifice therein, and thence through the orifice and vent tube returned to the inside of the container.

Figure 2 illustrates the circumjacent position of the tapered groove 5 with respect to the spout 3 and indicates the location of the orifice 6 and vent tube 7 at the lowest point in the bottom of the groove.

The details of my invention may be modified to meet the requirements of liquids of differing viscosity and the peculiarities of vessels of various kinds. For convenience of illustration I have indicated my invention as applied to a glass receptacle utilizing a metal cover and spout and employed in the dispensing of lubricating oil. Other uses and modifications will be obvious. I do not therefore desire to limit myself to the exact disclosure otherwise than is required by the scope of the appended claims.

I claim as my invention:—

1. In a pouring device comprising a cover-spout attached to a vessel containing a liquid, a groove recessed in the top of the cover and circumjacent to the base of the spout, an orifice in the bottom of the groove, and a vent means affixed to the inner surface of the cover at the orifice in the groove, whereby any liquid adhering to the outside of the spout will be collected in the groove and diverted into the vessel through the orifice and vent tube, thus preventing said liquid from coming into contact with the outside of vessel.

2. In a pouring device comprising a cover and spout attached to a vessel containing a liquid, a groove recessed in the top of the cover circumjacent to the base of the spout and the groove oblique with respect to horizontal plane of the cover, an orifice at the low point of the groove, and a vent tube affixed to the inner surface of the cover at the orifice, whereby any liquid adhering to the outside of the spout will be collected in the groove and diverted into the vessel through the orifice and vent tube, thus preventing said liquid from coming into contact with the outside of vessel.

3. In a pouring device comprising a cover and spout attached to a vessel for dispensing a liquid, a groove recessed in the top of the cover circumjacent to the base of the spout and the groove bevelled to drain toward its lower portion, the lower portion having an orifice therein and a vent tube affixed to the inner surface of the cover at the orifice, the vent tube being bent at an angle to prevent discharge of the liquid from within the vessel when the vessel is inverted, whereby any liquid adhering to the outside of the spout will be collected in the groove and diverted into the vessel through the orifice and vent tube, thus preventing said liquid from coming into contact with the outside of vessel.

In testimony whereof. I affix my signature.

JOSEPH F. TICHY.